(12) United States Patent
Lan

(10) Patent No.: US 10,180,598 B2
(45) Date of Patent: Jan. 15, 2019

(54) IN-PLANE SWITCHING LIQUID CRYSTAL DISPLAY

(71) Applicant: A.U. VISTA, INC., Milpitas, CA (US)

(72) Inventor: Yi-Fen Lan, Hsin-Chu (TW)

(73) Assignee: A.U. Vista, Inc., Milpitas, CA (US)

( * ) Notice: Subject to any disclaimer, the term of this patent is extended or adjusted under 35 U.S.C. 154(b) by 2 days.

(21) Appl. No.: 15/334,460

(22) Filed: Oct. 26, 2016

(65) Prior Publication Data

US 2018/0113362 A1 Apr. 26, 2018

(51) Int. Cl.
*G02F 1/1337* (2006.01)
*G02F 1/1335* (2006.01)
(Continued)

(52) U.S. Cl.
CPC ........ *G02F 1/133707* (2013.01); *G02F 1/137* (2013.01); *G02F 1/133528* (2013.01);
(Continued)

(58) Field of Classification Search
CPC ........ G02F 1/133707; G02F 1/134363; G02F 1/133528; G02F 1/137; G02F 2201/124; G02F 2001/133531; G02F 2001/13793; G02F 1/1343; G02F 1/134309; G02F 1/13439; G02F 1/136286; G02F 1/155; G02F 1/1393; G02F 1/1395; G02F 1/136; G02F 1/218; G02F 1/134327;
(Continued)

(56) References Cited

U.S. PATENT DOCUMENTS 6,642,071 B2   11/2003  Cheng
2003/0085406 A1*  5/2003  Cheng ............... G02F 1/134363
                                                          257/72
(Continued)

FOREIGN PATENT DOCUMENTS

CN   105446044   3/2016
TW   I518424     1/2016

OTHER PUBLICATIONS

Yoon, Sukin et al., "Study on the light leakage mechanism of a blue phase liquid crystal cell with oblique interfaces," Journal of Physics D: Applied Physics, vol. 45, 105304, Feb. 24, 2012, 6 pages.
(Continued)

*Primary Examiner* — Edward Glick
*Assistant Examiner* — Shan Liu
(74) *Attorney, Agent, or Firm* — Ware, Fressola, Maguire & Barber LLP

(57) ABSTRACT

An in-plane switching liquid crystal display having a plurality of protrude electrodes of a special shape is disclosed. Each of the protrusion electrodes has a protrusion body with a surface coated with an electrically conductive material. The protrusion body has flat side located on the lower substrate of the liquid crystal display, defining the basewidth of the protrusion electrodes. The protrusion body has a top portion with a round head and a bottom portion with a waist portion, smaller than the basewidth. It has been found that, the round head of the top portion and the waist portion of the bottom portion can improve the efficiency of the optical transmissivity of the liquid crystal layer as well the contrast between the bright state and the dark state of the display.

9 Claims, 11 Drawing Sheets

(51) Int. Cl.
    *G02F 1/1343*     (2006.01)
    *G02F 1/137*     (2006.01)

(52) U.S. Cl.
    CPC ............... *G02F 1/134363* (2013.01); *G02F 2001/13793* (2013.01); *G02F 2001/133531* (2013.01); *G02F 2201/124* (2013.01)

(58) Field of Classification Search
    CPC ............ G02F 1/134336; G02F 1/0316; G02F 2001/134318; G02F 2001/134372; G02F 2001/134381; G02F 2001/134345; G02F 2001/1357; G02F 2001/136218; G02F 2001/136295; G02F 2001/1552; G02F 2001/1555; G02F 2001/1557; G02F 2001/13629; G02F 2201/12; G02F 2201/121; G02F 2201/122; G02F 2201/123; G02F 2201/14; G02F 1/133753; G02F 1/3775; G02F 2001/13787; G02F 1/3548; H01L 27/124; H01L 27/3276; H01L 27/3297; H01L 27/3279; H01L 27/329; H01L 23/4953; H01L 2933/0016; G09G 2300/0421; G09G 2300/0426; G09G 2300/0439; G09G 3/3659

USPC .......................................... 349/139–148, 129
See application file for complete search history.

(56) References Cited

U.S. PATENT DOCUMENTS

| | | | |
|---|---|---|---|
| 2003/0218664 A1* | 11/2003 | Sakamoto | G02F 1/133555 347/114 |
| 2004/0227891 A1* | 11/2004 | Hirota | G02F 1/133753 349/141 |
| 2010/0195028 A1* | 8/2010 | Kubota | G02F 1/134363 349/106 |
| 2011/0128491 A1 | 6/2011 | Kubota et al. | |
| 2013/0128207 A1* | 5/2013 | Nakano | G02F 1/1343 349/141 |
| 2015/0060866 A1* | 3/2015 | Hwang | H01L 27/124 257/72 |
| 2016/0026025 A1* | 1/2016 | Zhao | G02F 1/13394 349/96 |
| 2016/0282679 A1* | 9/2016 | Choi | H01L 27/1288 |
| 2017/0131597 A1* | 5/2017 | Tsao | G02F 1/134309 |

OTHER PUBLICATIONS

Taiwan Office Action, Taiwan Patent Application No. 106135177, dated Nov. 14, 2018, 10 pages.

* cited by examiner

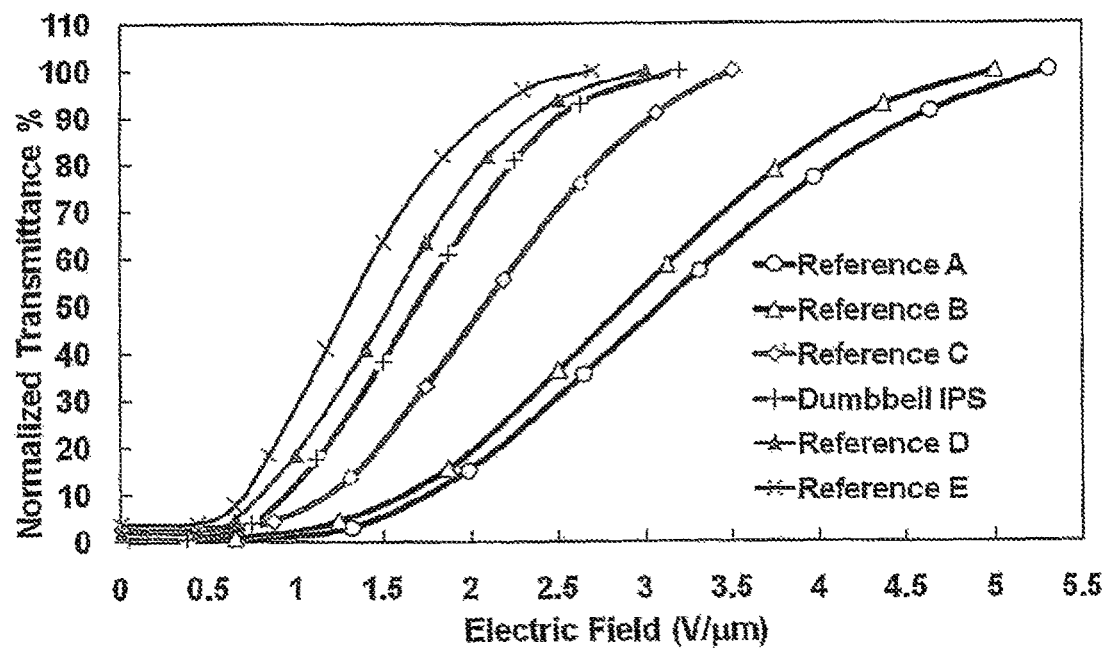
FIG. 11
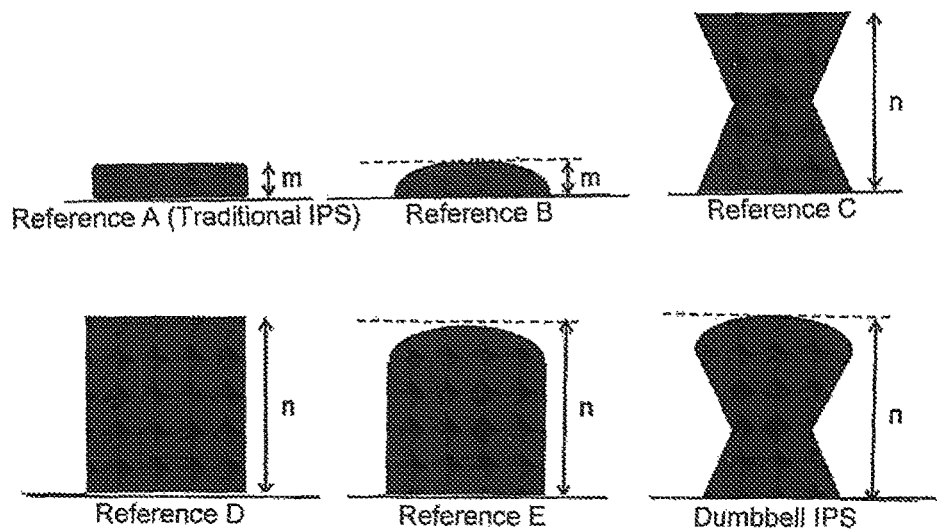

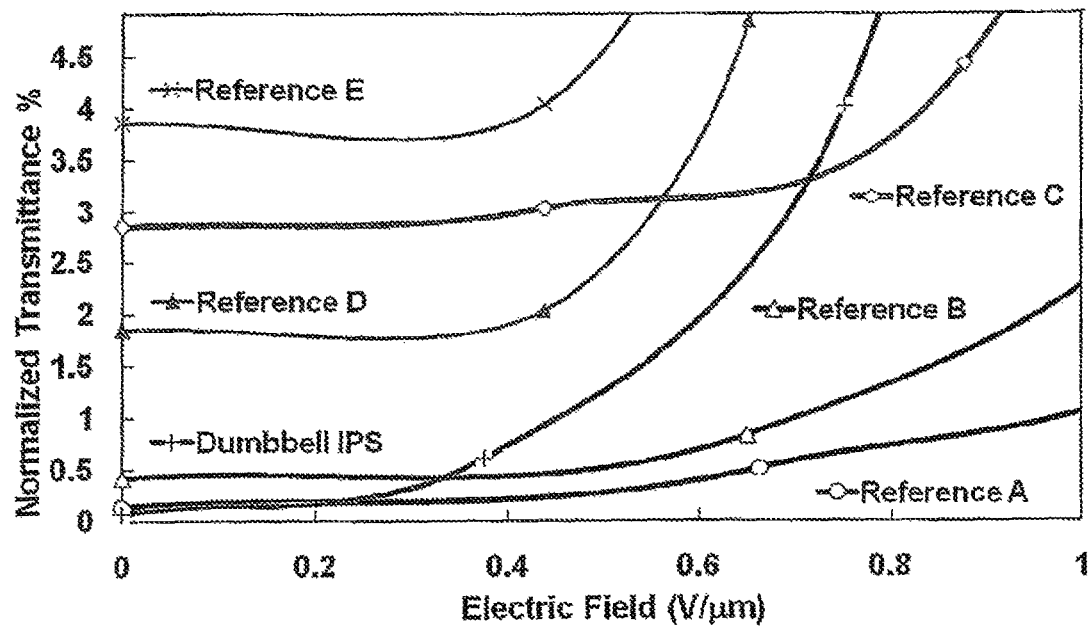
FIG. 12
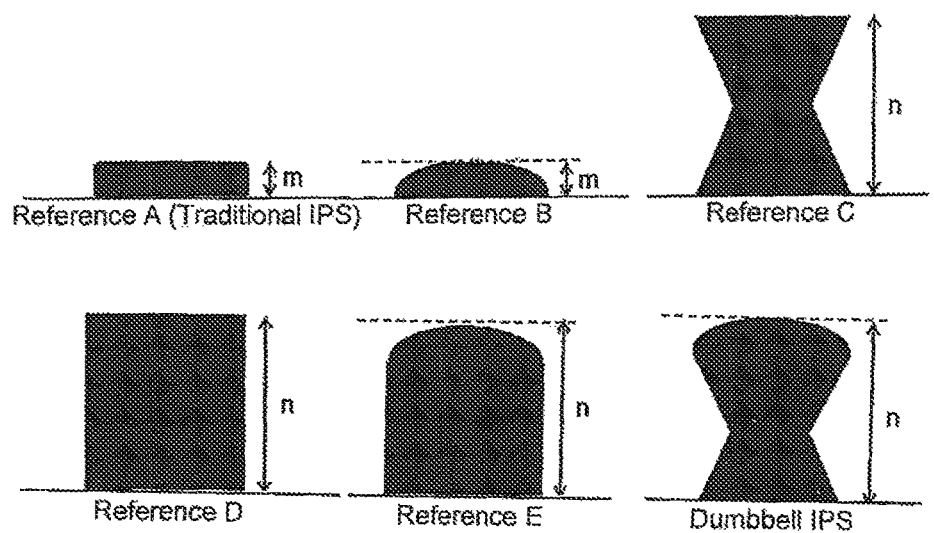

IN-PLANE SWITCHING LIQUID CRYSTAL DISPLAY

TECHNICAL FIELD

The present invention relates generally to a liquid-crystal display (LCD) and, more particularly, to an in-plane switching LCD.

BACKGROUND TECHNOLOGY

In-plane switching (IPS) is a display technology that has been used in a liquid crystal display (LCD) panel wherein twisted nematic (TN) or chiral nematic liquid crystals are used as a light-controlling medium. In particular, in a display panel where a nematic liquid, crystal material known as the blue-phase light crystal (BPLC) is used to control the transmission of light, the structure of the electrodes plays an important role in controlling the driving voltage of the liquid crystal display and the contrast of the display.

In an IPS LCD panel using a nematic liquid crystal as the light controlling medium, the electric field that controls the alignment or configuration of the liquid crystal molecules is provided by two sets of protrusion electrodes alternately arranged on the lower substrate of the display. Typically, the display panel has two substrates and two polarizes with different polarization directions disposed on each of the substrates. The configuration of the liquid crystal molecules, along with the polarization directions of the two polarizers, controls the optical transmissivity of the display.

SUMMARY OF THE DISCLOSURE

The present invention provides a shape of the protrusion electrodes for use in an in-plane switching liquid crystal display for achieving a good contrast between the "bright" state and the "dark" state of the display. In particular, the protrusion electrodes have a cross sectional area having a top portion with round head and a bottom portion with a waist.

Thus, one aspect of the present invention is to provide a liquid crystal display, which comprises:

a first substrate;

a second substrate;

a liquid crystal layer disposed between the first substrate and the second substrate, the liquid crystal layer comprising a plurality of liquid crystal molecules configured between a first state and a second state in response to a voltage potential, the liquid crystal molecules having optical isotropicity defined by the first state and the second state;

a first polarizer adjacent to the first substrate, the first polarizer having a first polarization direction;

a second polarizer adjacent to the second substrate, the second polarizer having a different second polarization direction, the first polarization direction and the second polarization direction controlling optical transmissivity of the liquid crystal display at least partly based on the optical isotropicity of the liquid crystal molecules;

a plurality of first protrusion electrodes and a plurality of second protrusion electrodes alternately arranged on the second substrate such that each of the first protrusion electrodes is adjacent to but spaced from at least one of the second protrusion electrodes, wherein each of the first protrusion electrodes and each of the plurality of second protrusion electrodes have a protrusion body with a surface and an electrically conductive coating provided on at least part of the surface, the protrusion body having a cross-sectional area comprising a flat side adjacent to the second substrate, a round side opposing the flat side, and a body section between the flat side and the round side, such that the body section is bound by the round side, the flat side, a first area side and a second area side, the flat side having a basewidth, wherein the first area side and the second area side are separated by a varied distance, the varied distance having a shortest distance defining a waist of the body section, the waist smaller than the basewidth; and a voltage source electrically coupled to the electrically conductive layer of the first protrusion electrodes and the second protrusion electrodes, the voltage source arranged to provide the voltage potential between a first protrusion electrode and an adjacent second protrusion electrode, such that the liquid crystal molecules are configured in the first state when the voltage potential is provided between the first protrusion electrodes and the second protrusion electrodes, and the liquid crystal molecules are configured in the second state, when the first protrusion electrodes are electrically coupled to the second protrusion electrodes.

According to an embodiment of the present invention, the body section comprises a top portion having the round side, and a bottom portion having the flat side, the first area side and the second area side, the bottom portion adjoining the top portion, wherein the top portion has an arcuate edge and a flat edge adjoining the arcuate edge, the flat edge having a flat edge length, and the bottom portion is bound by an upper edge, a lower edge, a first side edge and a second side edge, the first side edge defining the first area side, the second side edge defining the second area side, the upper edge parallel to the lower edge, the upper edge having an upper edge length equal to the flat edge length, the lower edge having a lower edge length equal to the basewidth of the flat side, and wherein the arcuate edge and the flat edge of the top portion define a first angle at a joining point of the arcuate edge and the flat edge, and the upper edge and the first side edge of the bottom portion define a second angle at a joining point of the upper edge and the first side edge, a sum of the first angle and the second angle having an angle range between 90 and 180 degrees.

According to an embodiment of the present invention, the bottom portion has a portion height separating the upper edge and the lower edge, and the bottom portion comprises a first trapezoid and a second trapezoid adjoining the first trapezoid, wherein the first trapezoid is bound by a first side, a second side, a third side and a fourth side, the first side parallel to and separated by a first height from the second side, the first side having a first side length equal to the basewidth, the second side having a second side length equal to the waist of the body section, and the second trapezoid is bound by a fifth side, a sixth side, a seventh side and an eighth side, the fifth side parallel to and separated by a second height from the sixth side, the fifth side having a fifth side length equal to the second side length of the first trapezoid, the sixth side having a sixth side length equal to the upper edge length of the bottom portion, and wherein the third side and the seventh side define the first side edge of the bottom portion;

the fourth side and the eighth side define the second side edge of the bottom portion;

the second angle is defined at a joining point of the sixth side and the seventh side of the second trapezoid; and a sum of the first height and the second height is equal to the portion height, and wherein the sixth side length is smaller than, equal to, or greater than the first side length, and the first height is smaller than, equal to, or greater than the second height.

According to an embodiment of the present invention, the lower edge of the bottom portion comprises a first straight line having a first line length equal to the basewidth; the upper edge of the bottom portion comprises a second straight line having a second line length equal to the flat edge length of the top portion; the first side edge of the bottom portion comprises a first curved line; the second side edge of the bottom portion comprises a second curved line, and wherein a smallest distance between the first side edge and the second side edge is equal to the waist of the body section; and the second angle of the bottom portion is defined by a joining point of the first curved line and the second straight line.

According to an embodiment of the present invention, the lower edge of the bottom portion comprises a first straight line having a first line length equal to the basewidth; the upper edge of the bottom portion comprises a second straight line having a second line length equal to the flat edge of the top portion; the first side edge of the bottom portion comprises a first curved line and a first straight section adjoining the first straight line at a right angle; and the second side edge of the bottom portion comprises a second curved line and a second straight section adjoining the first straight line at a right angle, and wherein a smallest distance between the first side edge and the second side edge is equal to the waist of the body section, and the second angle of the bottom portion is defined at a joining point of the first curved line and the second straight line.

According to an embodiment of the present invention, the lower edge of the bottom portion comprises a first straight line having a first line length equal to the basewidth;

the upper edge of the bottom portion comprises a second straight line having a second line length equal to the flat edge length of the top portion; the first side edge of the bottom portion comprises a first curved line and a first straight section adjoining the second straight line at a right angle; and the second side edge of the bottom portion comprises a second curved line and a second straight section adjoining the second straight line at a right angle, and wherein a smallest distance between the first side edge and the second side edge is equal to the waist of the body section, and the second angle of the bottom portion is defined at a joining point of the first straight section and the second straight line.

According to an embodiment of the present invention, the bottom portion has a portion height separating the upper edge and the lower edge, and the bottom portion comprises a first trapezoid, a rectangle adjoining the first trapezoid, and a second trapezoid adjoining the rectangle, wherein the first trapezoid is bound by a first side, a second side, a third side and a fourth side, the first side parallel to and separated by a first height from the second side, the first side having a first side length equal to the basewidth, the second side having a second side length equal to the waist of the body section;

the rectangle has a rectangle height and a rectangle width equal to the second side length, the rectangle comprising a first rectangle side and a second rectangle side separated by the rectangular width; and the second trapezoid is bound by a fifth side, a sixth side, a seventh side and an eighth side, the fifth side parallel to and separated by a second height from the sixth side, the fifth side having a fifth side length equal to the rectangle width, the sixth side having a sixth side length equal to the upper edge length of the bottom portion, and wherein the third side, the first rectangle side and the seventh side define the first side edge of the bottom portion;

the fourth side, the second rectangle side and the eighth side define the second side edge of the bottom portion;

a sum of the first height, the rectangle height and the second height is equal to the portion height; and the second angle of the bottom portion is defined at a joining point of the sixth side and the seventh side of the second trapezoid, and wherein the sixth side length is smaller than, equal to, or greater than the first side length, and the first height is smaller than, equal to, or greater than the second height.

According to an embodiment of the present invention, the bottom portion has a portion height separating the upper edge and the lower edge, and the bottom portion comprises a first trapezoid, a second trapezoid adjoining the first trapezoid, a rectangle adjoining the first trapezoid, wherein the first trapezoid is bound by a first side, a second side, a third side and a fourth side, the first side parallel to and separated by a first height from the second side, the first side having a first side length equal to the basewidth, the second side having a second side length equal to the waist of the body section;

the second trapezoid is bound by a fifth side, a sixth side, a seventh side and an eighth side, the fifth side parallel to and separated by a second height from the sixth side, the fifth side having a fifth side length equal to the second side length, the sixth side having a sixth side length equal to the upper edge length of the bottom portion; and the rectangle has a rectangle height and a rectangle width equal to the first side length, the rectangle comprising a first rectangle side and a second rectangle side separated by the rectangle width, and wherein the third side, the first rectangle side and the seventh side define the first side edge of the bottom portion;

the fourth side, the second rectangle side and the eighth side define the second side edge of the bottom portion;

a sum of the first height, the rectangle height and the second height is equal to the portion height, and the second angle of the bottom portion is defined at a joining point of the sixth side and the seventh side of the second trapezoid, and wherein the sixth side length is smaller than, equal to, or greater than the first side length, and the first height is smaller than, equal to, or greater than the second height.

According to an embodiment of the present invention, the bottom portion has a portion height separating the upper edge and the lower edge, and the bottom portion comprises a first trapezoid, a second trapezoid adjoining the first trapezoid, a rectangle adjoining the second trapezoid, wherein the first trapezoid is bound by a first side, a second side, a third side and a fourth side, the first side parallel to and separated by a first height from the second side, the first side having a first side length equal to the basewidth, the second side having a second side length equal to the waist of the body section;

the second trapezoid is bound by a fifth side, a sixth side, a seventh side and an eighth side, the fifth side parallel to and separated by a second height from the sixth side, the fifth side having a fifth side length equal to the second side length, the sixth side having a sixth side length equal to the upper edge length of the bottom portion; and the rectangle has a rectangle height and a rectangle width equal to the second side length, the rectangle comprising a first rectangle side and a second rectangle side separated by the rectangle width, an upper rectangle edge and a lower rectangle edge separated by the rectangle height, and wherein the third side, the first rectangle side and the seventh side define the first side edge of the bottom portion, the fourth side, the second rectangle side and the eighth side define the second side edge of the bottom portion, a sum of the first height, the rectangle height and the second height is equal to the portion height and the second angle of the bottom portion is defined at a joining point of first rectangle side and the upper rectangle edge, and wherein the sixth side length is smaller than, equal to, or greater than the first side length, and the first height is smaller than, equal to, or greater than the second height According to present invention, the body section further comprises an extended portion location between the lower edge of the bottom portion and the second substrate, wherein the extended portion has an extended upper edge and an extended lower edge parallel to the extended upper edge, the extended upper edge having a length equal to the lower edge length of the bottom portion, the extended lower edge having a length smaller than, equal to, or greater than the lower edge length.

According to an embodiment of the present invention, the bottom portion further comprises a rectangle located between the second side of the first trapezoid and the fifth side of the second trapezoid, the rectangle having a width equal to the second side length.

According to an embodiment of the present invention, the arcuate edge of the top portion is a section of a circle defined by a radius of curvature, the arcuate edge having a first length and the flat edge of the top portion having a second length, and wherein a ratio of the first length to the radius of curvature is greater than 0 but smaller than or equal to $2\pi$, and a ratio of the second length to the radius of curvature is greater than 0 but smaller than or equal to 2.

According to an embodiment of the present invention, the arcuate edge of the top portion is a section of a parabolic arc.

Another aspect of the present invention is a liquid crystal display, which comprises:

a first substrate;

a second substrate;

a liquid crystal layer disposed between the first substrate and the second substrate, a plurality of first protrusion electrodes and a plurality of second protrusion electrodes alternately arranged on the second substrate such that each of the plurality of first protrusion electrodes is adjacent to but spaced from at least one of the plurality of second protrusion electrodes, wherein each of the plurality of first protrusion electrodes and each of the plurality of second protrusion electrodes have an elongated body, the elongated body having a round top, a flat bottom contacting the second substrate, and a waist located between the round top and a flat bottom, the flat bottom having a width and a length, wherein the waist is smaller than the width; and a voltage source electrically coupled to the plurality of first protrusion electrodes and the plurality of second protrusion electrodes, the voltage source arranged to provide a voltage potential between a first protrusion electrode and an adjacent second protrusion electrode, such that the liquid crystal layer is configured in a first optical state when the voltage potential is provided between the first protrusion electrodes and the second protrusion electrodes, and the liquid crystal molecules are configured in a second optical second state, when the first protrusion electrodes are electrically coupled to the second protrusion electrodes.

According to an embodiment of the present invention, the round top comprises an elongated curved edge and the elongated body comprises a protrusion body with a varied width located between the elongated curved edge and the flat bottom, the varied width having a smaller width defining the waist.

According to an embodiment of the present invention, the protrusion body comprises a first end joining the elongated curved edge at a joining line and a second end joining the flat bottom, and wherein the first end of the protrusion body and the elongated curved edge define an angle at the joining line, the angle having an angle range between 90 and 180 degrees.

According to an embodiment of the present invention, the elongated body has a surface and an electrically conductive layer provided on at least part of the surface, and wherein the voltage source is electrically coupled to the electrically conductive layer to provide the voltage potential.

According to an embodiment of the present invention, the elongated body is made of an electrically conductive material.

The present invention will become apparent upon reading the description in conjunction with FIGS. 1A to 13.

BRIEF DESCRIPTION OF THE DRAWINGS

FIG. 11 shows the transmittance versus the electric field for protrusion electrodes with different cross sectional areas.

FIG. 12 shows the transmittance of in the dark state for protrusion electrodes with different cross section areas.

DETAILED DESCRIPTION OF THE INVENTION

It has been found that the shape of the protrusion electrodes is a factor in determining the display quality of an in-plane switching (IPS) liquid crystal display (LCD). The shape of the protrusion electrodes not only affects the transmittance efficiency versus the potential difference between two adjacent electrodes when the pixel is in the "bright" state, but also affects the opacity of the pixel is in the "dark" state. The transparency of the liquid crystal display in the bright state and the opacity of the liquid crystal display in the dark state define the contrast of the LCD.

Figure 1A:
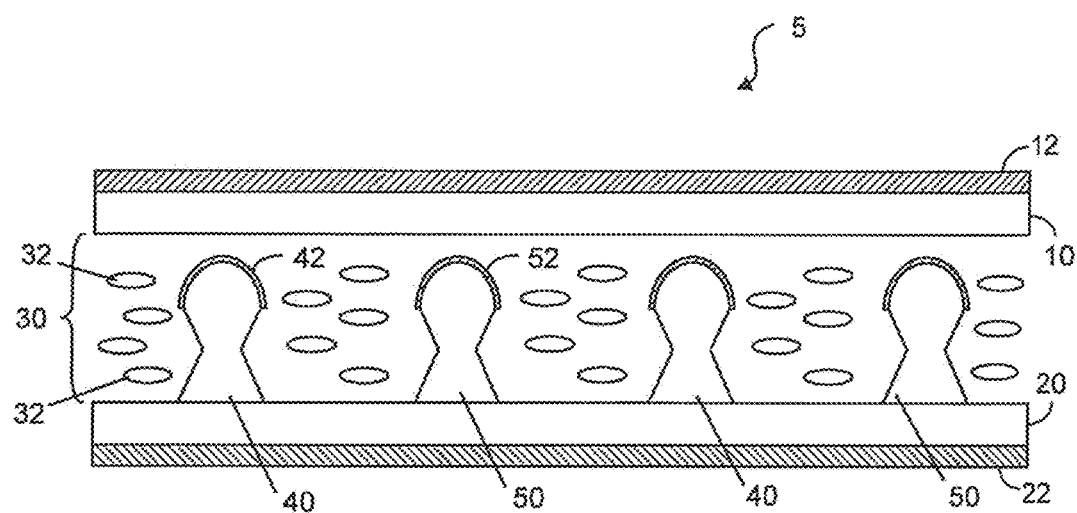
FIG. 1A illustrates a cross-sectional view of the liquid crystal display, according an embodiment of the present invention.
Figure 1B:
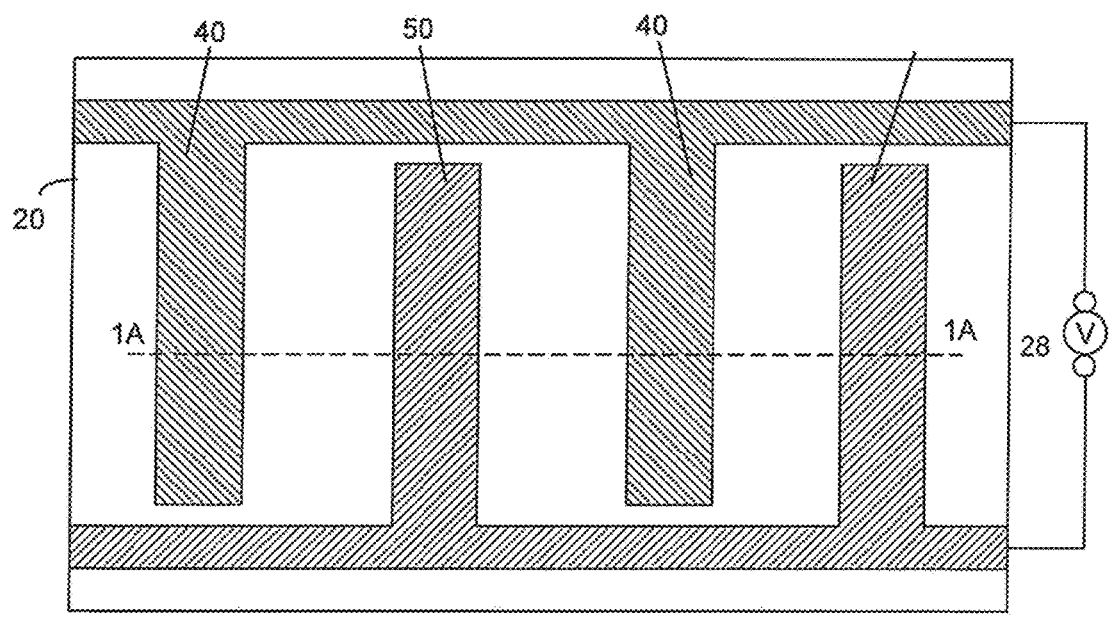
FIG. 1B illustrates a top view of the lower substrate of the liquid crystal display having a plurality of first protrusion electrodes and a plurality of second protrusion electrodes disposed thereon.

As seen in FIG. 1A-1B which illustrate an embodiment of the present invention, the liquid crystal display 5 has a first substrate 10, a second substrate 20 and a liquid crystal layer 30 disposed between the first substrate and the second substrate. The display 5 also has a first polarizer 12 disposed adjacent to the first substrate 10 and a second polarizer 22 disposed adjacent to the second substrate 20, a plurality of first protrusion electrodes 40 and a plurality of second protrusion electrodes 50 alternately arranged on the second substrate 20 such that each of the first protrusion electrodes is adjacent to but spaced from at least one of the second protrusion electrodes. Each of the first protrusion electrodes 40 has an electrically conductive coating 42 and each of the second protrusion electrodes 50 has an electrically conductive coating 52. In a different embodiment, each of the first protrusion electrode 40 and the second protrusion electrode 50 is made of a conductive material such as indium tin oxide, aluminum or copper. A voltage source 28 electrically coupled to the coating 42 and the coating 52 is used to provide a voltage potential or electric field between a first protrusion electrode 40 and an adjacent second protrusion electrode 50.

Figure 2A:
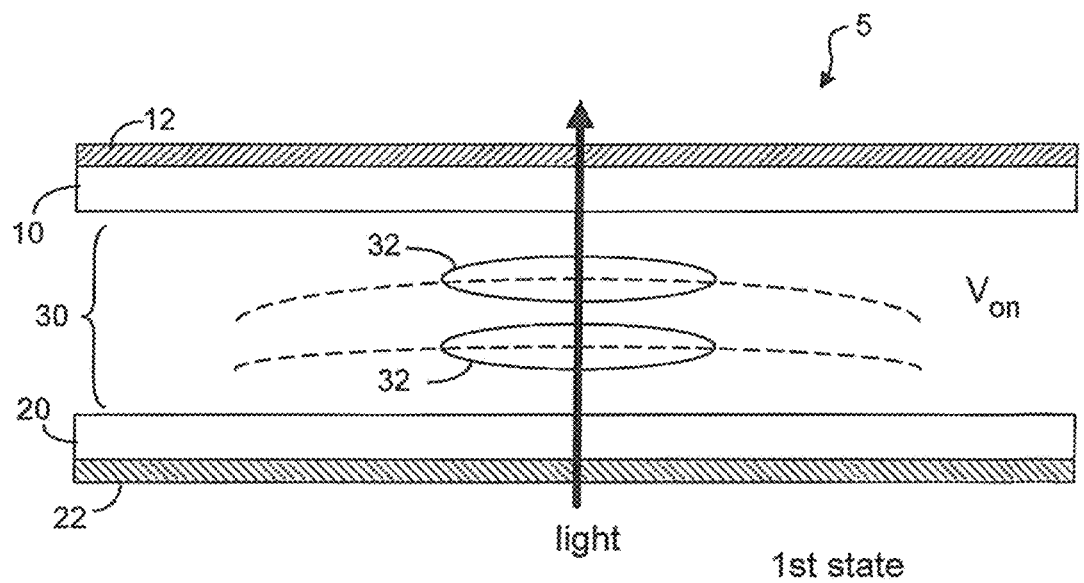
FIG. 2A is graphical presentation of the liquid crystal display when the liquid crystal molecules are configured in a first state, according an embodiment of the present invention.
Figure 2B:
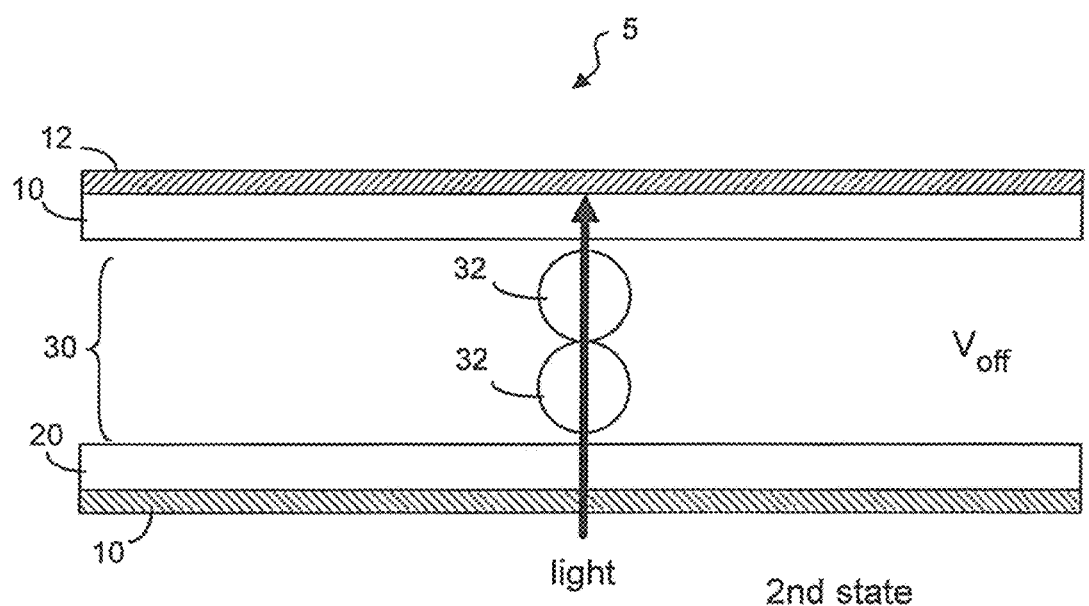
FIG. 2B is graphical presentation of the liquid crystal display when the liquid crystal molecules are configured in a second state, according an embodiment of the present invention.

It is understood that the first polarizer 12 has a first polarization direction and the second polarizer 22 has a different second polarization direction. The liquid crystal layer 30 comprises a plurality of liquid crystal molecules 32 configured or aligned in response to a voltage potential as illustrated in FIGS. 2A-2B. The optical isotropicity of the liquid crystal layer 30 is defined by the first state and the second state in which the liquid crystal molecules 32 are aligned. The optical isotropicity of the liquid crystal layer 30, along with the first and second polarization directions, determines the optical transmissivity of the liquid crystal display. According to an embodiment of the present invention, the liquid crystal molecules 32 are configured in the first state when the voltage potential is provided between the first protrusion electrodes 40 and the second protrusion electrodes 50, and the liquid crystal molecules 32 are configured in the second state, when the first protrusion electrodes 40 are electrically coupled to the second protrusion electrodes 50.

Figure 3:
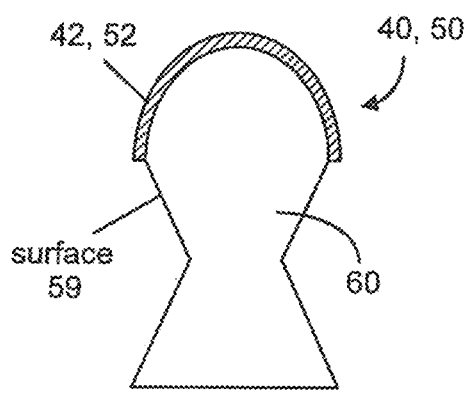
FIG. 3 is a cross-sectional view of a protrusion electrode having a surface and an electrically conductive coating provided on a part of the surface, according an embodiment of the present invention.
Figure 3A:
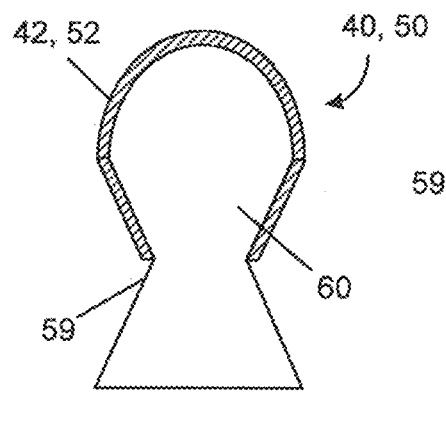
FIG. 3A shows the electrically conductive coating being provided on a larger part of the surface.
Figure 3B:
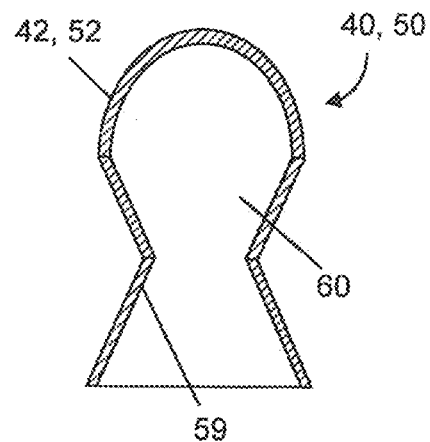
FIG. 3B shows the electrically conductive coating being provided on the entire surface of the protrusion electrode.

As shown in FIGS. 3, 3A, 3B and 4, each of the first protrusion electrodes 40 and each of the second protrusion electrodes 50 have a protrusion body 60 and an electrically conductive coating 42, 52 provided on at least part of the surface 59 of the protrusion body 60. As seen in FIG. 3, the coating 42, 52 is only provided on the top part of the protrusion electrode 40, 50. As seen in FIG. 3A, the coating 42, 52 is provided on a larger part of the surface of the protrusion electrode 40, 50. As seen in FIG. 3B, the coating 42,52 is provided on the entire surface of the protrusion electrode 40, 50.

Figure 4:
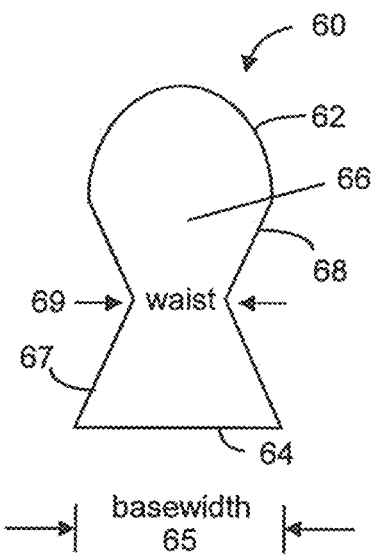
FIG. 4 is a cross-section of a protrusion body of the protrusion electrodes, according an embodiment of the present invention.

As seen in FIG. 4, the protrusion body 60 has a cross-sectional area comprising a flat side 64 adjacent to the second substrate 20 (see FIG. 1A), a round side 62 opposing the flat side 64, and a body section 66 between the flat side 64 and the round side 62. As seen in FIG. 4, the body section 66 is bound by the round side 62, the flat side 64, a first area side 67 and a second area side 68. The flat side 64 defines a basewidth 65 of the protrusion electrodes 49, 50. The first area side 67 and the second area side 68 are separated by a varied distance, the short distance of which defines a waist 69 of the body section 66. According to embodiments of the present invention, the waist 69 is smaller than the basewidth 65.

Figure 5:
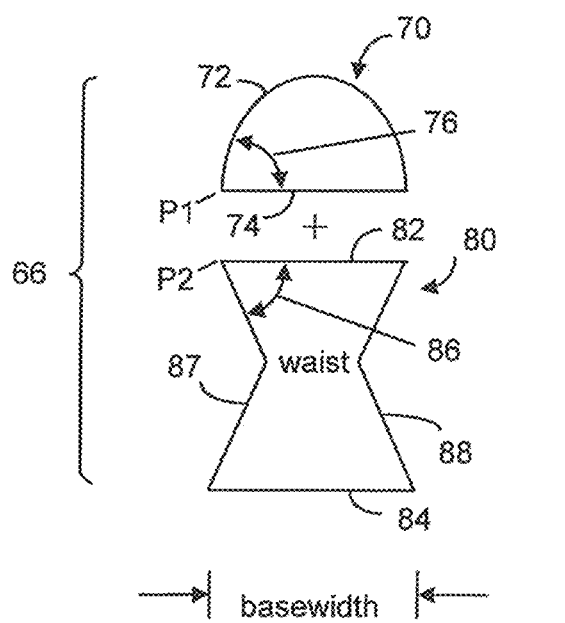
FIG. 5 illustrates two adjoining parts of the protrusion body, according an embodiment of the present invention.

According to an embodiment of the present invention, the body section 66 of the protrusion electrodes 40, 50 can be represented by a top portion 70 and an adjoining upper portion 80. The top portion 70 includes the round side 62, and the bottom portion 80 includes the flat side 64, the first area side 67 and the second area side 68, with the bottom portion 80. As seen in FIG. 5, the top portion 70 has an arcuate edge 72 and a flat edge 74 adjoining the arcuate edge 72. The bottom portion 80 has upper edge 82, a lower edge 84, a first side edge 87 and a second side edge 88. The first side edge 87 defines the first area side 67 of the body section 66 and the second side edge 88 defines the second side 68 of the body section 66, such that the bottom portion 80 is bound by the upper edge 82, the first side edge 87, the lower edge 84 and the second side edge 87. The length of the flat edge 74 of the top portion 70 is substantially equal to length of the upper edge 82 of the bottom portion 80. The length of lower edge 84 of the bottom portion 80 defines the basewidth of the protrusion electrodes 40, 50. The arcuate edge 72 and the flat edge 74 of the top portion 70 define a first angle 76 at their joining point P1. The upper edge 82 and the first side edge 87 of the bottom portion 80 define a second angle 86 and their joining point P2. According to various embodiments of the present invention, the sum of the first angle 76 and the second angle 86 is defined by an angle range between 90 and 180 degrees.

Figure 6A:
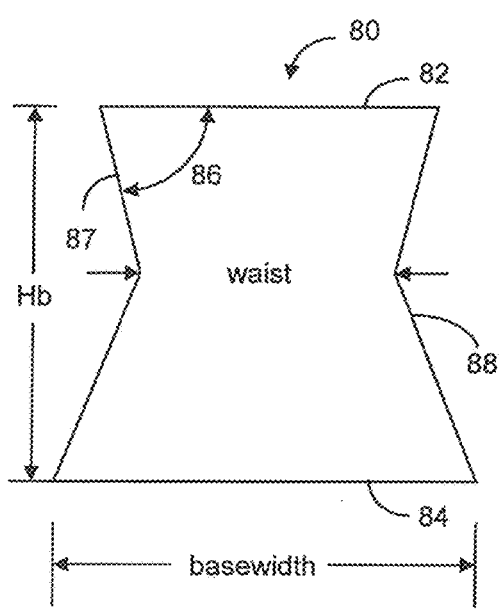
FIG. 6A illustrates a bottom portion of the protrusion body, according an embodiment of the present invention.
Figure 6B:
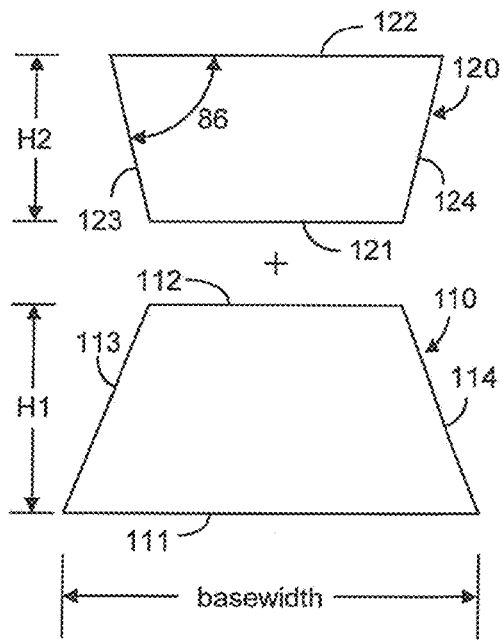
FIG. 6B illustrates two adjoining parts making up the bottom portion of FIG. 6A, according an embodiment of the present invention.

As seen in FIG. 6A, each of the first side edge 87 and second side edge 88 of the bottom portion 80 is made up of two straight lines. The upper edge 82 is parallel to and separated from the lower edge 84 by the height Hb of the bottom portion 80. The bottom portion 80 can be represented by two adjoining trapezoids 110 and 120 as shown in FIG. 6B.

The first trapezoid 110 is bound by a first side 111, a second side 112, a third side 113 and a fourth side 114. The first side 111 is parallel to and separated from the second side 112 by a height H1. The first side 111 has a first side length equal to the basewidth and the second side 112 has a second side length. The second trapezoid 120 is bound by a fifth side 121, a sixth side 122, a seventh side 123 and an eighth side 124. The fifth side 121 is parallel to and separated from the sixth side 122 by a height H2. The fifth side 121 has a fifth side length equal to the length of the second side 112 of the first trapezoid 110. The sixth side 122 has a sixth side length equal to the upper edge length 82 of the bottom portion 80. The third side 113 of the first trapezoid 110 and the seventh side 123 of the second trapezoid 120 define the first side edge 87 of the bottom portion 80. The fourth side 114 of the first trapezoid 110 and the eighth side 124 of the second trapezoid 120 define the second side edge 88 of the bottom portion 80. In this embodiment, the second angle 86 of the bottom portion 80 is defined at the joining point of the sixth side 122 and the seventh side 123 of the second trapezoid 120. According to embodiments of the present invention, the length of the sixth side 122 of the second trapezoid 120 can be smaller than, equal to, or greater than the length of the first side 111 of the first trapezoid 110. The first height H1 of the first trapezoid 110 can be smaller than, equal to, or greater than the second height H2 of the second trapezoid. The total height (H1+H2) of the two trapezoids is equal to the height Hb of the bottom portion 80.

Figure 7A:
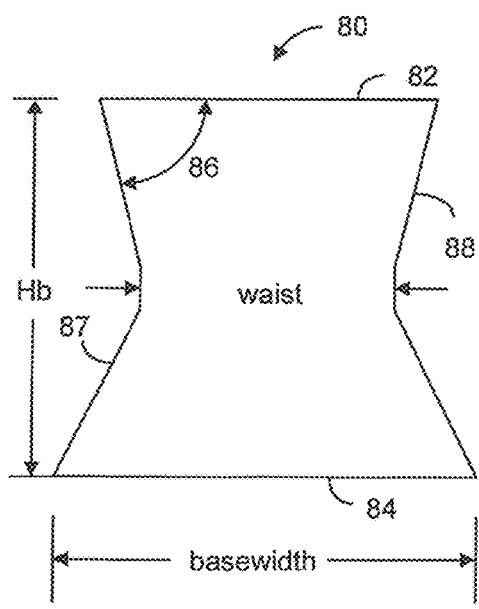
FIG. 7A illustrates a bottom portion of the protrusion body, according to a different embodiment of the present invention.
Figure 7B:
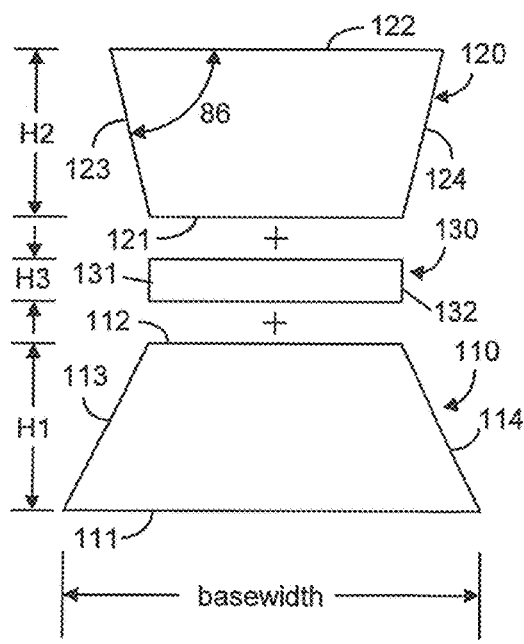
FIG. 7B illustrates three adjoining parts making up the bottom portion of FIG. 7A, according an embodiment of the present invention.

FIGS. 7A and 7B illustrate another embodiment of the present invention. As seen in FIGS. 7A and 7B, the bottom portion 80 can be represented by a first trapezoid 110, a rectangle 130 and a second trapezoid 120. The rectangle 130 has a height H3, and two sides 131, 132 separated by the width of the rectangle 130. As seen in FIG. 7A, each of the first side edge 87 and the second side edge 88 of the bottom portion 80 is made up of three straight lines. As seen in FIG. 7B, the first trapezoid 110 is bound by a first side 111, a second side 112, a third side 113 and a fourth side 114. The first side 111 is parallel to and separated from the second side 112 by a height H1. The first side 111 has a length equal to the basewidth and the second side 112 having a second side length. The width of the rectangle 130 is substantially equal to the length of the second side 112 of the first trapezoid 110. The second trapezoid 120 is bound by a fifth side 121, a sixth side 122, a seventh side 123 and an eighth side 124. The fifth side 121 is parallel to and separated from the sixth side 122 by a height H2. The fifth side 121 having a length equal to the second side length of the first trapezoid 110. The sixth side 122 has a length equal to the upper edge length 82 of the bottom portion 80. The third side 113 of the first trapezoid 110, a first side 131 of the rectangle 130 and the seventh side 123 of the second trapezoid 120 define the first side edge 87 of the bottom portion 80. The fourth side 114 of the first trapezoid 110, a second side 132 of the rectangle 130 and the eighth side 124 of the second trapezoid 120 define the second side edge 88 of the bottom portion 80. In this embodiment, the second angle 86 of the bottom portion 80 is defined at the joining point of the sixth side 122 and the seventh side 123 of the second trapezoid 120. According to embodiments of the present invention, the length of the sixth side 122 of the second trapezoid 120 can be smaller than, equal to, or greater than the length of the first side 111 of the first trapezoid 110. The height H1 of the first trapezoid 110 can be smaller than, equal to, or greater than the height H2 of the second trapezoid 120. The total height (H1+H2+H3) of the three parts is equal to Hb of the bottom portion 80.

Figure 8A:
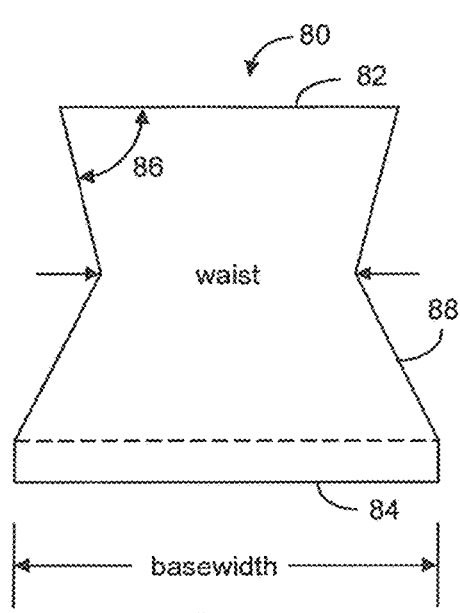
FIG. 8A illustrates a bottom portion of the protrusion body, according to yet another embodiment of the present invention.
Figure 8B:
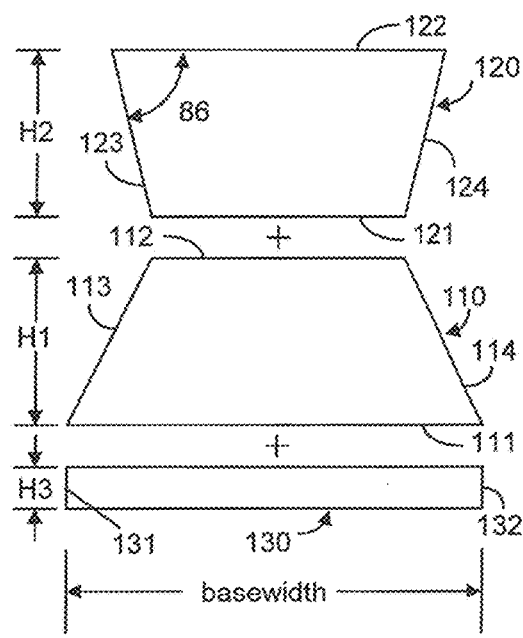
FIG. 8B illustrates three adjoining parts making up the bottom portion of FIG. 8A, according an embodiment of the present invention.

FIGS. 8A and 8B illustrate a different embodiment of the present invention. As seen in FIGS. 8A and 8B, the bottom portion 80 can be represented by a first trapezoid 110, a second trapezoid 120, and a rectangle 130. As seen in FIG. 8A, each of the first side edge 87 and second side edge 88 of the bottom portion 80 is made up of three straight lines. As seen in FIG. 8B, the first trapezoid 110 is bound by a first side 111, a second side 112, a third side 113 and a fourth side 114. The first side 111 is parallel to and separated from the second side 112 by a height H1. The first side 111 has a length equal to the basewidth and the second side 112 having a second side length. The rectangle 130 has a height H3 and a width equal to the length of the first side 111 of the first trapezoid 110. The rectangle 130 has a first side 131 and a second side 132 separated by the width of the rectangle. The second trapezoid 120 is bound by a fifth side 121, a sixth side 122, a seventh side 123 and an eighth side 124. The fifth side 121 is parallel to and separated from the sixth side 122 by a height H2. The fifth side 121 has a length equal to the second side length of the first trapezoid 110. The sixth side 122 has a length equal to the upper edge length 82 of the bottom portion 80. The third side 113 of the first trapezoid 110, the first side 131 of the rectangle 130 and the seventh side 123 of the second trapezoid 120 define the first side edge 87 of the bottom portion 80. The fourth side 114 of the first trapezoid 110, the second side 132 of the rectangle 130 and the eighth side 124 of the second trapezoid 120 define the second side edge 88 of the bottom portion 80. In this embodiment, the second angle 86 of the bottom portion 80 is defined at the joining point of the sixth side 122 and the seventh side 123 of the second trapezoid 120. According to embodiments of the present invention, the length of the sixth side 122 can be smaller than, equal to, or greater than the length of the first side 111. The height H1 of the first trapezoid 110 can be smaller than, equal to, or greater than the height H2 of the second trapezoid 120. The total height (H1+H2+H3) of the three parts is equal to Hb of the bottom portion 80.

Figure 8C:
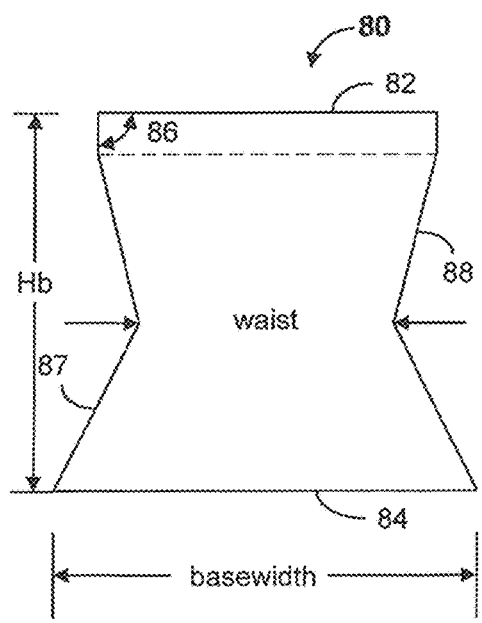
FIG. 8C illustrates a different embodiment of bottom portion, according to an embodiment of the present invention.
Figure 8D:
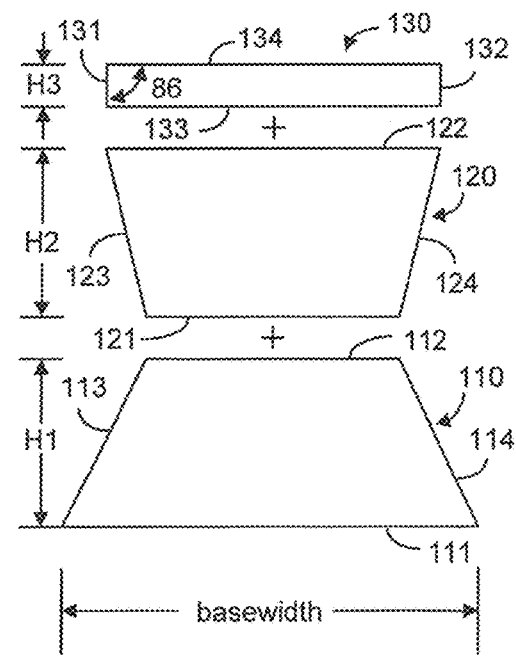
FIG. 8D illustrates three adjoining parts making up the bottom portion of FIG. 8C, according an embodiment of the present invention.

FIGS. 8C and 8D illustrate yet another embodiment of the present invention. As seen in FIGS. 8C and 8D, the bottom portion 80 can be represented by a first trapezoid 110, a second trapezoid 120, and a rectangle 130. As seen in FIG. 8C, each of the first side edge 87 and second side edge 88 of the bottom portion 80 is made up of three straight lines. As seen in FIG. 8D, the first trapezoid 110 is bound by a first side 111, a second side 112, a third side 113 and a fourth side 114. The first side 111 is parallel to and separated from the second side 112 by a height H1. The first side 111 has a length equal to the basewidth and the second side 112 having a second side length. The second trapezoid 120 is bound by a fifth side 121, a sixth side 122, a seventh side 123 and an eighth side 124. The fifth side 121 is parallel to and separated from the sixth side 122 by a height H2. The fifth side 121 has a length equal to the second side length of the first trapezoid 110. The sixth side 122 has a length equal to the upper edge length 82 of the bottom portion 80. The rectangle 130 has a height H3 and a width equal to the length of the sixth side 122 of the second trapezoid 120. The rectangle 130 has a first side 131 and a second side 132 separated by the width of the rectangle, an upper edge 134 and a lower edge 132 separated by the height H3. The third side 113 of the first trapezoid 110, the first side 131 of the rectangle 130 and the seventh side 123 of the second trapezoid 120 define the first side edge 87 of the bottom portion 80. The fourth side 114 of the first trapezoid 110, the second side 132 of the rectangle 130 and the eighth side 124 of the second trapezoid 120 define the second side edge 88 of the bottom portion 80. In this embodiment, the second angle 86 of the bottom portion 80 is a right angle defined at the joining point of the upper edge 134 and the first side 131 of the rectangle 130. According to embodiments of the present invention, the length of the sixth side 122 can be smaller than, equal to, or greater than the length of the first side 111. The height H1 of the first trapezoid 110 can be smaller than, equal to, or greater than the height H2 of the second trapezoid 120. The total height (H1+H2+H3) of the three parts is equal to Hb of the bottom portion 80.

Figure 9B:
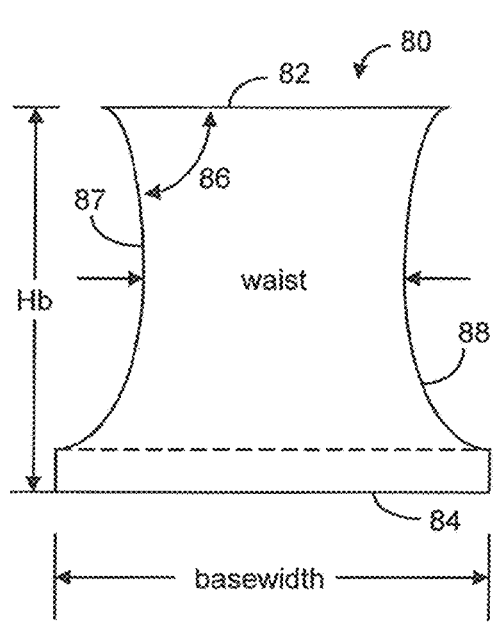
FIG. 9B illustrates still another embodiment of the bottom portion.
Figure 9A:
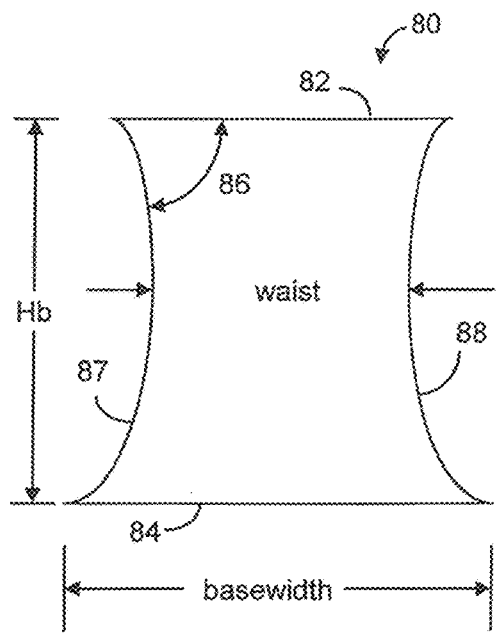
FIG. 9A illustrates another embodiment of the bottom portion.

In an embodiment of the present invention as shown in FIG. 9A, the bottom portion 80 is bound by a first straight line defining the lower edge 84, a second straight line defining the upper edge 82, a first curved line defining the first side edge 87 and a second curved line defining the second side edge 88. The first straight line can be shorter than, equal to, or longer than the second straight line. In this embodiment, the second angle 86 of the bottom portion 86 is defined at the joining point of the second straight line and the first curved line.

In a different embodiment of the present invention as shown in FIG. 9B, the bottom portion 80 is similar to that as shown in FIG. 9A except that each of the first curve line defining the first side edge 87 and the second curved line defining the second side edge 88 has a straight section adjoining the first straight line that defines the lower edge 84 at a right angle. In this embodiment, the second angle 86 of the bottom portion 86 is defined at the joining point of the second straight line and the first curved line.

Figure 9C:
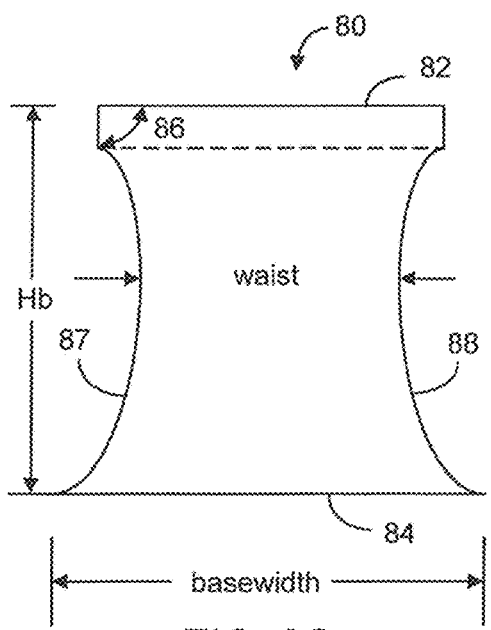
FIG. 9C illustrates a different embodiment of the bottom portion.

In yet another embodiment of the present invention as shown in FIG. 9C, the bottom portion 80 is similar to that as shown in FIG. 9A except that each of the first curved line defining the first side edge 87 and the second curved line defining the second side edge 88 has a straight section adjoining the second straight line that defines the upper edge 82 at a right angle. In this embodiment, the second angle 86 of the bottom portion 86 is defined at the joining point of the second straight line and the straight section.

Figure 10A:
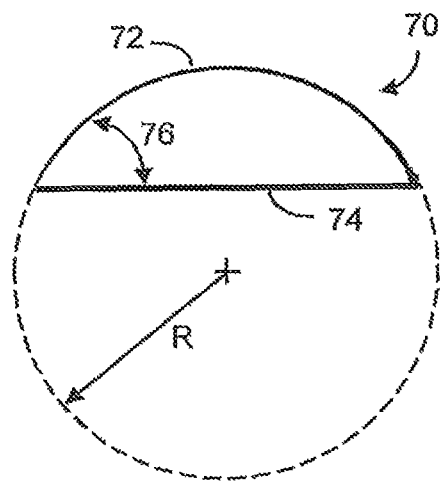
FIG. 10A illustrates a top portion of the protrusion body, according to one embodiment of the present invention.

According to an embodiment of the present invention, the top portion 70 can be represented by an area segment of a circle defined by a radius of curvature R. As seen in FIG. 10A, the arcuate edge 72 of the top portion 70 is part of the circumference of the circle, and the flat edge 74 is connected to the two sides of the arcuate edge 72. The arcuate edge 70 has a first edge length and the flat edge 72 has a second edge length such that the ratio of the first edge length to the radius of curvature R is greater than 0 but smaller than or equal to π, and the ratio of the second edge length to the radius of curvature R is greater than 0 but smaller than or equal to 2. When the ratio of the first edge length to the radius of curvature R is equal to π, the ratio of the second edge length to the radius of curvature R is equal to 2 and the first angle 76 is equal to 90 degrees.

Figure 10B:
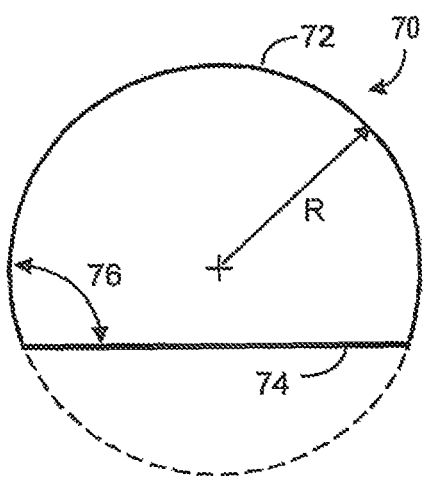
FIG. 10B illustrates a top portion of the protrusion body, according to another embodiment of the present invention.

According to another embodiment of the present invention as seen in FIG. 10B, the first edge length of the top portion 70 is greater than πR and the first angle 76 is greater than 90 degrees.

Figure 10C:
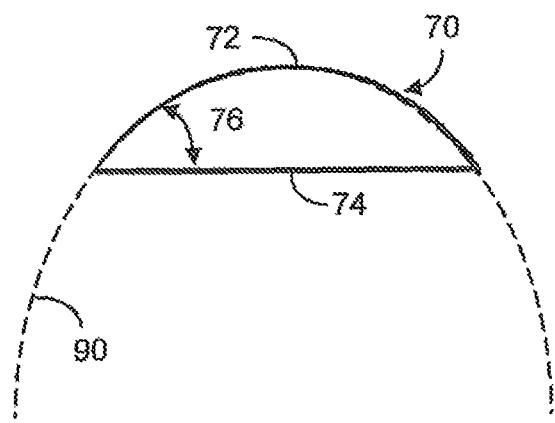
FIG. 10C illustrates a top portion of the protrusion body, according to a different embodiment of the present invention.

According to yet another embodiment of the present invention as seen in FIG. 10C, the arcuate edge 72 is a segment of a parabola 90.

As mentioned above, the shape of the protrusion electrodes is an important factor in determining the display quality of an in-plane switching (IPS) liquid crystal display (LCD). In particular, the shape of the protrusion electrodes affects the transmittance efficiency versus the potential difference between two adjacent electrodes when the pixel is in the "bright" state, and also affects the opacity of the pixel is in the "dark" state. As shown in FIG. 11, the transmittance is affected by the shape of the electrodes as represented by the cross sectional area of the electrodes. In FIG. 11, six transmittance curves related to six difference shapes of the electrodes are plotted against the electric field. The shape of the protrusion electrodes of the present invention is referred to as the "dumbbell IPS". As seen in FIG. 11, the "dumbbell"-shaped electrode of the present invention is the third most efficient shape where 100% transmittance can be achieved around the electric field of 3.1 V/um. The two most efficient shapes of the electrodes are "Reference E" and "Reference D". However, as seen in FIG. 12, when the liquid crystal display is in the "dark" state when the electric field is near or below 0.4 V/um, the electrodes of "Reference D" and "Reference E" have a considerable light-leak problem. The light-leak at the "dark" state affects the contrast of the liquid crystal display. It is to show that the shape of the protrusion electrodes, according to various embodiments of the present invention as illustrated FIGS. 3-10C, result in a liquid crystal display of a higher quality than the other shapes of the electrodes in an in-plane switching design.

The shape of the protrusion electrodes, not only affects the quality of the liquid crystal display as described above, but also affects the other aspects of the display. As seen in FIG. 11, the protrusion electrodes of "Reference A" and "Reference B" require the highest driving voltage. Furthermore, the protrusion electrodes of "Reference B" have serious light leakage in the display, resulting in a pattern of single brighter lines known as the "line MURA" defect. Each of the single brighter lines substantially coincides with the top of protrusion electrode. The protrusion electrodes of "Reference D" show serious light leakage, resulting in a pattern of double brighter lines. The double brighter lines suggest that the light leakage occurs along the two sides of the protrusion electrode. The protrusion electrodes of "Reference C" result in dot and line MURA. The protrusion electrodes of "Reference E" also show the light leakage pattern similar to those of "Reference B". The light leakage from the protrusion electrodes of "Reference C", "Reference D" and "Reference E" affects the "dark" state of the liquid crystal display as seen in FIG. 12. However, when the shape of the protrusion electrodes of "Reference B" is incorporated into the shape of the protrusion electrodes of "Reference C", it is experimentally found that the light-leak effect in the "dark" state of the liquid crystal display is eliminated or substantially reduced while the driving voltage is comparable to that of "Reference D" without its light leaking problem.

Figure 13:
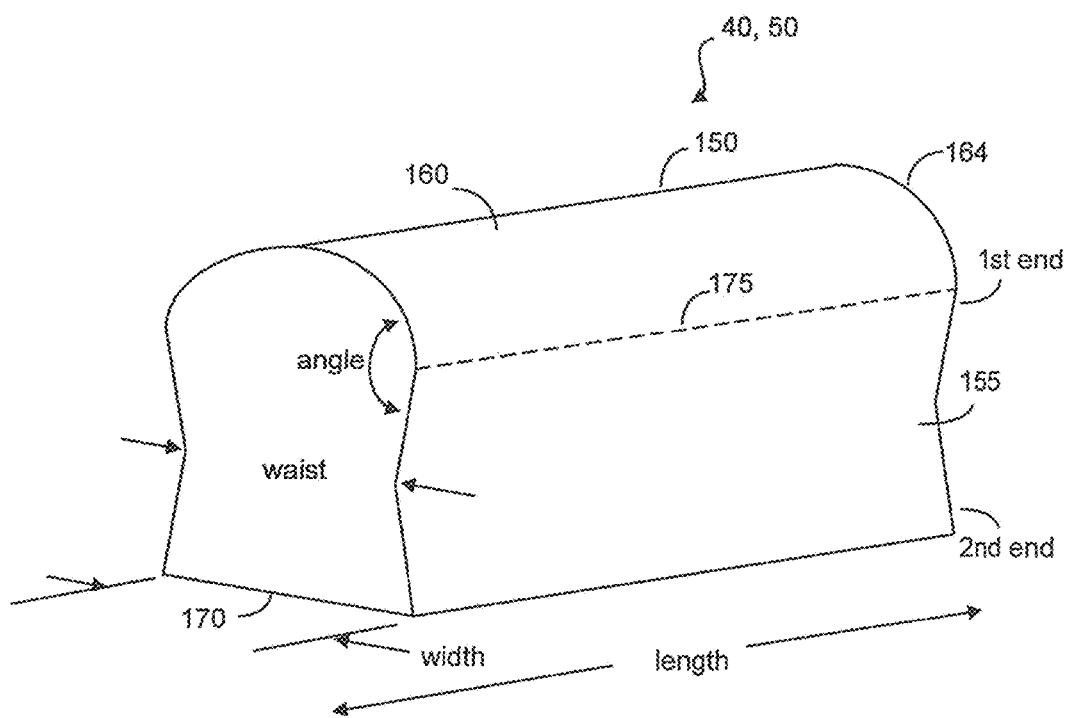
FIG. 13 shows a section of the protrusion electrodes, according to one embodiment of the present invention.

Instead of showing the cross section of the protrusion electrodes, FIG. 13 shows a section of the protrusion electrodes, according to one embodiment of the present invention. As seen in FIG. 13, the protrusion electrode 40, 50 has an elongated body 150, the elongated body having a round top 160, a flat bottom 170 contacting the second substrate (20, FIG. 1A), and a waist located between the round top 160 and a flat bottom 170, the flat bottom 170 having a width and a length, wherein the waist is smaller than the width. The round top 160 comprises an elongated curved edge 164 and the elongated body comprises a body portion 155 with a varied width located between the elongated curved edge 164 and the flat bottom 170, the varied width having a smaller width defining the waist. The protrusion body comprises a first end joining the elongated curved edge at a joining line 175 and a second end joining flat bottom, wherein the first end of the protrusion body and the elongated curved edge define an angle at the joining line, the angle having an angle range between 90 and 180 degrees. The elongated body 150 has a surface and an electrically conductive layer provided on at least part of the surface, and wherein the voltage source is electrically coupled to the electrically conductive layer to provide the voltage potential.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A liquid crystal display comprising:
   a first substrate;
   a second substrate;
   a liquid crystal layer disposed between the first substrate and the second substrate,
   a plurality of first protrusion electrodes and a plurality of second protrusion electrodes alternately arranged on the second substrate such that each of the plurality of first protrusion electrodes is adjacent to but spaced from at least one of the plurality of second protrusion electrodes, wherein each of the plurality of first protrusion electrodes and the plurality of second protrusion electrodes comprises a protrusion body, the protrusion body having a cross-sectional area comprising a flat side adjacent to the second substrate, a round side opposing the flat side, and a body section between the flat side and the round side, such that the body section is bound by the round side, the flat side, a first area side and a second area side, the flat side having a basewidth, wherein the first area side and the second area side are separated by a varied distance, the varied distance having a shortest distance defining a waist of the body section, the waist smaller than the basewidth; and
   a voltage source electrically coupled to the plurality of first protrusion electrodes and the plurality of second protrusion electrodes, the voltage source arranged to provide a voltage potential between a first protrusion electrode and an adjacent second protrusion electrode, such that
   the liquid crystal layer is configured in a first optical state in a case the voltage potential is provided between the first protrusion electrodes and the second protrusion electrodes, and the liquid crystal layer is configured in a second optical state in a case the first protrusion electrodes are electrically coupled to the second protrusion electrodes, wherein the body section comprises a top portion and a bottom portion adjoining the top portion, the top portion having the round side, the bottom portion having the flat side, the first area side and the second area side, and wherein
   the top portion has an arcuate edge and a flat edge adjoining the arcuate edge, the flat edge having a flat edge length, and
   the bottom portion is bound by an upper edge, a lower edge, a first side edge and a second side edge, the first side edge defining the first area side, the second side edge defining the second area side, the upper edge parallel to the lower edge, the upper edge having an upper edge length equal to the flat edge length, the lower edge having a lower edge length equal to the basewidth of the flat side, and wherein the waist is also smaller than the upper edge length, wherein
   the arcuate edge and the flat edge of the top portion define a first angle at a joining point of the arcuate edge and the flat edge, and
   the upper edge and the first side edge of the bottom portion define a second angle at a joining point of the upper edge and the first side edge, a sum of the first angle and the second angle having an angle range between 90 and 180 degrees, and wherein the bottom portion has a portion height separating the upper edge and the lower edge, and the bottom portion comprises a first trapezoid and a second trapezoid adjoining the first trapezoid, wherein
   the first trapezoid is bound by a first side, a second side, a third side and a fourth side, the first side parallel to and separated by a first height from the second side, the first side having a first side length equal to the basewidth, the second side having a second side length equal to the waist of the body section, and
   the second trapezoid is bound by a fifth side, a sixth side, a seventh side and an eighth side, the fifth side parallel to and separated by a second height from the sixth side, the fifth side having a fifth side length equal to the second side length of the first trapezoid, the sixth side having a sixth side length equal to the upper edge length of the bottom portion, and wherein
   the third side and the seventh side define the first side edge of the bottom portion;
   the fourth side and the eighth side define the second side edge of the bottom portion;
   the second angle is defined at a joining point of the sixth side and the seventh side of the second trapezoid; and
   a sum of the first height and the second height is equal to the portion height, and wherein
   the sixth side length is smaller than, equal to, or greater than the first side length, and
   the first height is smaller than, equal to, or greater than the second height.

2. The liquid crystal display according to claim 1, wherein the arcuate edge of the top portion is a section of a circle defined by a radius of curvature, the arcuate edge having a first length and the flat edge of the top portion having a second length, and wherein
   a ratio of the first length to the radius of curvature is greater than 0 but smaller than or equal to $2\pi$, and
   a ratio of the second length to the radius of curvature is greater than 0 but smaller than or equal to 2.

3. The liquid crystal display according to claim 1, wherein the arcuate edge of the top portion is a section of a parabolic arc.

4. The liquid crystal display according to claim 1, wherein the protrusion body has a surface and an electrically conductive layer provided on at least part of the surface, and wherein the voltage source is electrically coupled to the electrically conductive layer to provide the voltage potential.

5. The liquid crystal display according to claim 1, wherein the plurality of first protrusion electrodes and the plurality of second protrusion electrodes are made of an electrically conductive material.

6. A liquid crystal display comprising:
a first substrate;
a second substrate;
a liquid crystal layer disposed between the first substrate and the second substrate,
a plurality of first protrusion electrodes and a plurality of second protrusion electrodes alternately arranged on the second substrate such that each of the plurality of first protrusion electrodes is adjacent to but spaced from at least one of the plurality of second protrusion electrodes, wherein each of the plurality of first protrusion electrodes and each of the plurality of second protrusion electrodes have an elongated body, the elongated body having a round top, a flat bottom located on the second substrate; and
a voltage source electrically coupled to the plurality of first protrusion electrodes and the plurality of second protrusion electrodes, the voltage source arranged to provide a voltage potential between a first protrusion electrode and an adjacent second protrusion electrode, such that
the liquid crystal layer is configured in a first optical state in a case the voltage potential is provided between the first protrusion electrodes and the second protrusion electrodes, and the liquid crystal layer is configured in a second optical state in a case the first protrusion electrodes are electrically coupled to the second protrusion electrodes, wherein the round top comprises an elongated curved edge and the elongated body comprises a protrusion body with a varied width located between the elongated curved edge and the flat bottom, the protrusion body having a cross-sectional area comprising a flat side adjacent to the second substrate, a round side opposing the flat side, and a body section between the flat side and the round side, such that the body section is bound by the round side, the flat side, a first area side and a second area side, the flat side having a basewidth, wherein the first area side and the second area side are separated by a varied distance, the varied distance having a shortest distance defining a waist of the body section, the waist smaller than the basewidth, and wherein the body section comprises a top portion and a bottom portion adjoining the top portion, the top portion has an arcuate edge and a flat edge adjoining the arcuate edge, the flat edge having a flat edge length, and the bottom portion is bound by an upper edge, a lower edge, a first side edge and a second side edge, the first side edge defining the first area side, the second side edge defining the second area side, the upper edge parallel to the lower edge, the upper edge having an upper edge length equal to the flat edge length, the lower edge having a lower edge length equal to the basewidth of the flat side, and wherein the waist is also smaller than the upper edge length, wherein
the arcuate edge and the flat edge of the top portion define a first angle at a joining point of the arcuate edge and the flat edge, and
the upper edge and the first side edge of the bottom portion define a second angle at a joining point of the upper edge and the first side edge, a sum of the first angle and the second angle having an angle range between 90 and 180 degrees, and wherein the bottom portion has a portion height separating the upper edge and the lower edge, and the bottom portion comprises a first trapezoid and a second trapezoid adjoining the first trapezoid, wherein
the first trapezoid is bound by a first side, a second side, a third side and a fourth side, the first side parallel to and separated by a first height from the second side, the first side having a first side length equal to the basewidth, the second side having a second side length equal to the waist of the body section, and
the second trapezoid is bound by a fifth side, a sixth side, a seventh side and an eighth side, the fifth side parallel to and separated by a second height from the sixth side, the fifth side having a fifth side length equal to the second side length of the first trapezoid, the sixth side having a sixth side length equal to the upper edge length of the bottom portion, and wherein
the third side and the seventh side define the first side edge of the bottom portion;
the fourth side and the eighth side define the second side edge of the bottom portion;
the second angle is defined at a joining point of the sixth side and the seventh side of the second trapezoid; and
a sum of the first height and the second height is equal to the portion height, and wherein
the sixth side length is smaller than, equal to, or greater than the first side length, and
the first height is smaller than, equal to, or greater than the second height.

7. The liquid crystal display according to claim 6, wherein the first end of the protrusion body and the elongated curved edge define an angle at the joining line, the angle having an angle range between 90 and 180 degrees.

8. The liquid crystal display according to claim 6, wherein the elongated body has a surface and an electrically conductive layer provided on at least part of the surface, and wherein the voltage source is electrically coupled to the electrically conductive layer to provide the voltage potential.

9. The liquid crystal display according to claim 6, wherein the elongated body is made of an electrically conductive material.

* * * * *